(12) United States Patent
Trabold et al.

(10) Patent No.: US 7,781,118 B2
(45) Date of Patent: Aug. 24, 2010

(54) FUEL CELL FLOODING DETECTION

(75) Inventors: Thomas A Trabold, Pittsford, NY (US); Steven R Falta, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 987 days.

(21) Appl. No.: 10/774,964

(22) Filed: Feb. 9, 2004

(65) Prior Publication Data
US 2005/0175872 A1 Aug. 11, 2005

(51) Int. Cl.
*H01M 8/04* (2006.01)
(52) U.S. Cl. .................. 429/446; 429/400; 429/427
(58) Field of Classification Search .................. None
See application file for complete search history.

(56) References Cited
U.S. PATENT DOCUMENTS

| | | | |
|---|---|---|---|
| 5,939,218 A | | 8/1999 | Mizuno |
| 6,076,392 A | * | 6/2000 | Drzewiecki .............. 73/23.2 |
| 6,103,409 A | * | 8/2000 | DiPierno Bosco et al. .... 429/13 |
| 6,539,267 B1 | * | 3/2003 | Eryurek et al. ............. 700/51 |
| 2004/0081868 A1 | * | 4/2004 | Edlund ..................... 429/22 |
| 2004/0157098 A1 | * | 8/2004 | Wexel et al. ................ 429/26 |

OTHER PUBLICATIONS

Operating System Market Share from Market Share by Net Applications on www.marketshare.hitlist.com. Accessed on Dec. 9, 2009. < http://marketshare.hitslink.com/operating-system-market-share.aspx?qprid=8>.*

Montalbano, Elizabeth. "Forrester: Microsoft Office in No Danger From Competitors". PCWorld, Jun. 4, 2009. Accessed on Dec. 9, 2009. < http://www.pcworld.com/businesscenter/article/166123/forrester_microsoft_office_in_no_danger_from_competitors.html?tk=nl_dnx_h_crawl>.*

M.W. Wambsganss, J.A. Jendrzejczyk and D.M. France, "Two-Phase Flow Patterns And Transitions In A Small, Horizontal, Rectangular Channel", Int. J. Multiphase Flow vol. 17, No. 3., pp. 327-342, 1991.

Goichi Matsui "Identification Of Flow Regimes In Vertical Gas-Liquid Two-Phase Flow Using Differential Pressure Fluctuations", Int. J. Multiphase Flow vol. 10, No. 6, pp. 711-720, 1984.

D.J. Wheeler, J.S. Yi, R. Fredley, D. Yang, T. Patterson Jr., and L. VanDine, "Advancements In Fuel Cell Stack Technology At International Fuel Cells", Journal of New Materials for Materials for Electrochemical Systems 4, pp. 233-238, 2001.

* cited by examiner

*Primary Examiner*—Dah-Wei D Yuan
*Assistant Examiner*—Edu E Enin-Okut
(74) *Attorney, Agent, or Firm*—Harness, Dickey & Pierce, P.L.C.

(57) ABSTRACT

A pressure fluctuation parameter (for example, a statistical indicator such as a root-mean-square value) from a set of differential pressure measurements between the inlet and the outlet of a fuel cell reactant flow channel carrying vaporized water is used to define flooding onset. Vaporized water in the flow of gas (air) through the flow channels is controlled in response to the parameter. Benefits include efficient operation (i.e., minimized stoichiometry) and effective management of rapid power transients in a fuel cell.

2 Claims, 7 Drawing Sheets

FUEL CELL FLOODING DETECTION

FIELD OF THE INVENTION

The present invention relates to humidification of a fuel cell power system, and, in particular, to an apparatus and method for measuring the state of flooding in a humidified anode or cathode reactant flow and to prove a basis for optimizing proton exchange membrane hydration while minimizing flooding in cathode reactant feed channels when humidified air is used as a cathode feed stream, and humidified hydrogen or reformate is used as an anode feed stream.

BACKGROUND OF THE INVENTION

Fuel cell power systems convert a fuel and an oxidant to electricity. One fuel cell power system type of keen interest employs use of a proton exchange membrane or "PEM" to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system. The PEM has a reactive electrode disposed on each major face to form a membrane electrode assembly or MEA.

In a typical fuel cell assembly (stack) within a fuel cell power system, individual fuel cells have flow fields with inlets to fluid manifolds; which transport the various reactant feed streams in the stack to flow into each cell. Gas diffusion assemblies then provide a final fluid distribution to further disperse reactant feed stream from the flow fields to the reactive electrode of the MEAs.

Effective operation of a PEM requires adequate humidification of the PEM polymer to maintain its proton conductivity while maintaining transportation and distribution of the reactant feed streams in non-flooded operational states. In this regard, the oxidant, typically oxygen or oxygen-containing air, is supplied to the cathode where it reacts with hydrogen cations that have crossed the proton exchange membrane and electrons from an external circuit. Thus, the fuel cell generates both electricity and water through the electrochemical reaction. The water is removed with the cathode effluent, and, by some appropriate means of water vapor transfer, is used to humidify the inlet air stream. Without such humidification of the reactant streams, it is possible that under some conditions the cathode channels could evaporate water from the proton exchange membrane at an even higher rate than the rate of water generation (with commensurate dehydration of the PEM) via reaction at the cathode.

When hydrated, the polymeric proton exchange membrane possesses "acidic" properties that provide a medium for conducting protons from the anode to the cathode of the fuel cell. However, if the proton exchange membrane is not sufficiently hydrated, the "acidic" character diminishes, with commensurate diminishment of the desired electrochemical reaction of the cell.

A problem, however, in membrane hydration occurs when sufficient water is present in the two-phase flow of vaporized water and air to induce flooding in the reactant channels or the diffusion media of the cathode of the fuel cell, restricting reactant oxygen (i.e. oxygen in the air feed) from reaching catalytic sites at the membrane surface. Flooding typically occurs when the accumulation of liquid water is sufficient to adversely impact the flow of reactant gases through the flow channels or the diffusion media in a given cell or cells. Flooding degrades fuel cell performance because the accumulation of liquid water, either in the diffusion media or flow field channels, restricts access of reactant gas flows to catalytic sites of the membrane-electrode assembly (MEA) containing the PEM. Furthermore, insofar as flooding affects the temperature gradient in the plane of the MEA, flooding plausibly impacts durability of the fuel cell.

A partial solution to the flooding problem is to maintain a relatively "high" gas velocity in the flow channels distributing air (oxygen) for the cathode so that the water remains entrained in the cathode effluent. Another solution is to terminate or restrict the rate of water supplementation when flooding is detected; however, this is inherently a remedial action to minimize damage rather than a proactive approach to prevent damage insofar as a determination that flooding has occurred inherently means that some damage from flooding did occur within the fuel cell.

What is needed is a fuel cell power system providing (a) full humidification of the feed gases (especially the oxidant), (b) an accurate determination of the onset of flooding status, and (c) control action responsive to the determination of flooding onset sufficient to preclude flooding from actually occurring within the fuel cell. The present invention is directed to fulfilling this set of needs.

SUMMARY OF THE INVENTION

The invention is for a fuel cell of the type having at least one membrane electrode assembly in reactive interface to an oxidant reactant flow field carrying an oxidant reactant and to a fuel reactant flow field carrying a fuel. reactant where each flow field has an inlet to the fuel cell and an outlet from the fuel cell. The fuel cell further includes a humidifier in fluid communication with at least one reactant flow field inlet, a differential pressure transducer measuring differential pressure between the inlet and the outlet of the fuel cell reactant flow field receiving the humidified reactant water, and a control computer defining a differential pressure fluctuation parameter based on a set of differential pressure measurements from the transducer. In normal operation, a control element for the humidified reactant is controlled (by the computer) in response to the pressure fluctuation parameter so that a stream of humidified reactant is added to the flow field inlet.

In another form of the invention, a humidified reactant stream flows in at least one reactant flow channel in the flow field; a differential pressure transducer measures differential pressure between the inlet and the outlet of the fuel reactant flow channel in which the humidified reactant stream flows; and a control computer defines a differential pressure fluctuation parameter from a set of differential pressure measurements from the transducer.

In yet another form of the invention, a statistical indicator (such as a root-mean-square value) is calculated directly from a series of differential pressure measurements taken as a set.

In a further form of the invention, the differential pressure fluctuation parameter is defined from determining fluctuation instances in the set of differential pressure measurement signals along with a maximum value for each fluctuation instance, a minimum value for each fluctuation instance, and a single representative statistical value (such as a root-mean-square value) from all the maximum and minimum values of all fluctuation instances of the set.

The invention also provides for comparing the determined statistical value to a threshold variable value and controlling the humidification level in the reactant streams in response to the comparison.

In considering benefits from the invention, the precise measurement of differential pressure and control of humidifier water addition provides a basis for detecting the onset of flooding, operation at maximum efficiency respective to the quantity of individual reactants fed (minimized stoichiometry), effective management of rapid power transients, potential determination of stack purge status, and low-cost and space-effective measurement of header and manifold status in a fuel cell system.

Further areas of applicability of the present invention will become apparent from Figures and the Detailed Description Of The Preferred Embodiments provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
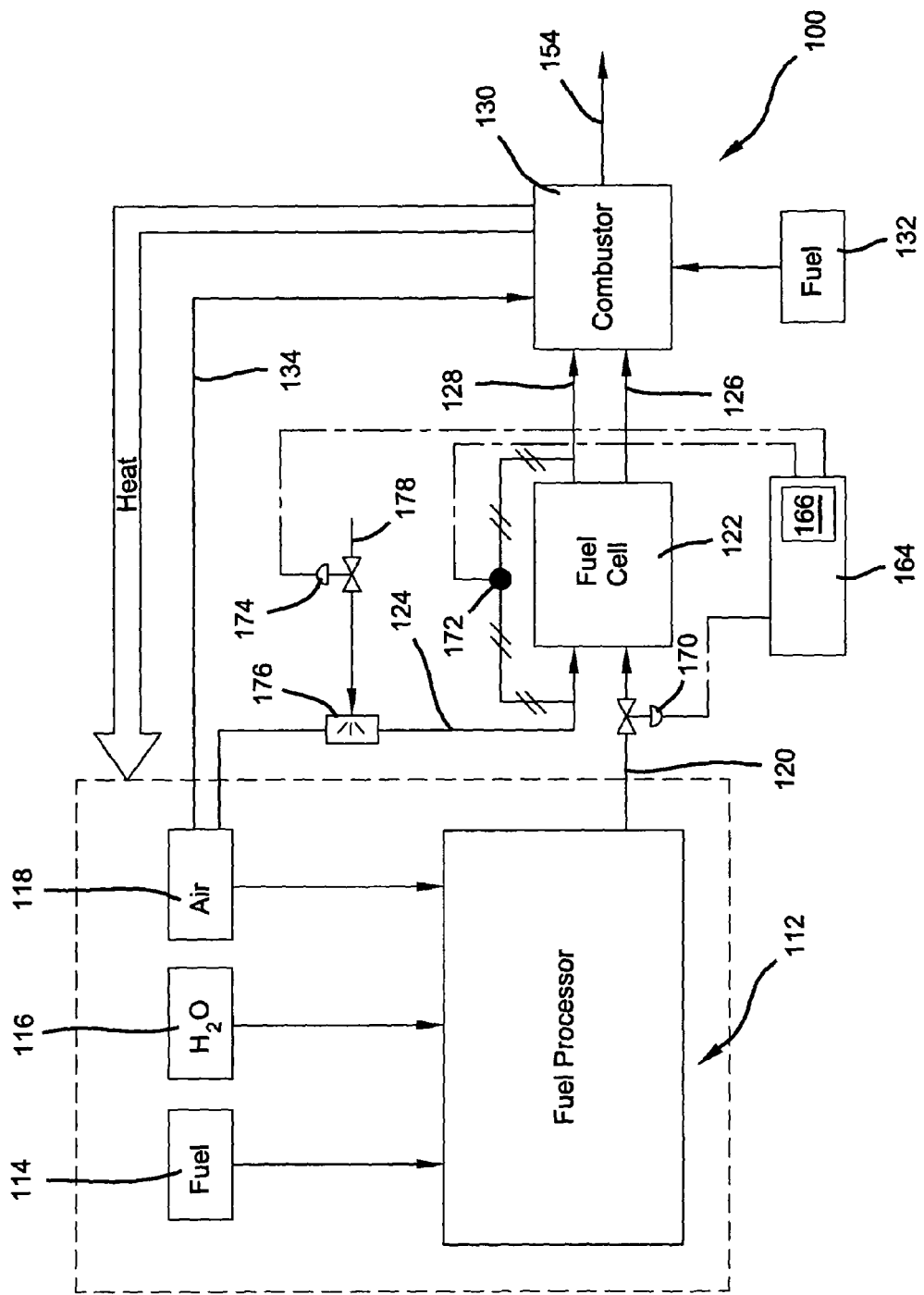
FIG. 1A shows a fuel processing system in combination with a fuel cell power system with water addition via a humidifier.

The following description of the preferred embodiment is merely exemplary in nature and is in no way intended to limit the invention, its application, or uses.

Real-time process control is generally implemented to control the fuel cell power system described herein. In this regard, real-time process control is generically defined as a method of control processing in which an event causes a given reaction within an actual time limit and wherein control response or actions are specifically controlled within the context of and by external conditions and actual times. As an associated clarification in the realm of process control, real-time computer controlled processing relates to the performance of associated process control logical, decision, and quantitative operations intrinsic to a process control decision program functioning as part of a controlled apparatus implementing a process (such as the fuel cell benefiting from the present invention) wherein the process control decision program is periodically executed with fairly high frequency usually having a period of between 20 ms and 2 sec for tactical control.

In overview of the preferred embodiments, the proper management of water produced in the cathodic oxygen reduction reaction of a fuel cell is essential to efficient fuel cell operation. The most desirable situation is to have water present in the cathode reactant flow field in the form of a mist or spray flow in which all liquid water is transported through the flow field in discrete droplet form. However, if too much water is present, flooding occurs and the flooding restricts reactant oxygen from reaching catalytic sites at the membrane surface of the PEM.

Addition of vaporized water into the inlet of the reactant flow field (usually into the cathode flow channels) helps in the hydration of the PEM. A "high" superficial two-phase flow velocity in the flow field which distribute oxygen (usually from air) for the cathode reaction helps minimize flooding insofar as the attendant gas inertia helps sustain a stabilizing two-phase flow of nebulized water and air in the cathode flow channels. However, in light of the negative implications of flooding, the ability to accurately detect the onset of flooding and then to modify the concentration of water in the two-phase flow to avoid flooding is also critical to stable and efficient operation of the PEM and the fuel cell. Straightforward attempts to sense and control flooding by directly measuring parameters (such as cell voltage or pressure drop across the stack) in real-time are confounded in enabling sufficiently rapid determination of flooding because (a) fluctuations in these signals occur over a long period of time, (b) fluctuations in these signals are of subtle magnitude (so that a flooding condition is recognized only after an appreciable amount of liquid water has accumulated), and (c) the threshold fluctuation needed for sensing flooding is reasonably close to "normal" fluctuations which derive from power transients (particularly in automotive applications for which a typical drive cycle is comprised of such frequent power transients).

However, since flooding phenomena are connected to changes in the structure of the gas-liquid two-phase flow somewhere in the fuel cell channels (most likely in either the porous diffusion media or flow field channels on the cathode side), a straightforward and yet sensitive method for determining flooding is to measure the differential pressure (or the difference between the absolute pressures) across the inlet and outlet of the fuel cell channel, and to then determine the ongoing fluctuations in the differential pressure and/or to determine a derived statistical indicator (such as a root-mean-square value) from a set of these fluctuations taken over a period of time. Control of the fuel cell is then implemented in response to the determination of flooding from the statistical indicator derived from the differential pressure measurements over time.

The invention is further understood with reference to a generic fuel cell power system. Therefore, before further describing the invention, a general overview of the power system within which the improved fuel cells of the invention operate is provided. In one embodiment of the system, a fuel cell is fueled by a hydrogen storage system and an air supply system. In another embodiment of the system, a hydrocarbon fuel is processed in a fuel processor, for example, by reformation and preferential oxidation processes, to produce a reformate gas which has a relatively high hydrogen content on a volume or molar basis. Therefore, reference is made to hydrogen-containing as having relatively high hydrogen content. The invention is hereafter described in the context of a fuel cell fueled by an $H_2$-containing reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons.

As shown in FIG. 1A, a fuel cell power system 100 includes a fuel processor 112 for catalytically reacting a reformable hydrocarbon fuel stream 114, and water in the form of steam from a water stream 116. In some fuel processors, air is also used in a combination partial oxidation/steam reforming reaction. In this case, fuel processor 112 also receives an air stream 118. The fuel processor 112 contains one or more reactors wherein the reformable hydrocarbon fuel in stream 114 undergoes dissociation in the presence of steam in stream 116 and air in stream 118 (optionally oxygen storage tank 118) to produce the hydrogen-containing reformate exhausted from fuel processor 112 in reformate stream 120. Fuel processor 112 typically also includes one or more downstream reactors, such as water-gas shift (WGS) and/or preferential oxidizer (PrOx) reactors that are used to reduce the level of carbon monoxide in reformate stream 120 to acceptable levels, for example, below 20 ppm. $H_2$-containing reformate 120 is fed through control valve 170 (in communication with real-time computer 164) to the anode chamber of fuel cell stack system 122. At the same time, oxygen in the form of air in stream 124 is fed into the cathode chamber of fuel cell stack system 122 after the air has acquired water in humidifier 176 from water source 178. Water flow from water source 178 is controlled to humidifier 176 by control valve 174 (in communication with real-time control computer 164).

Figure 1B:
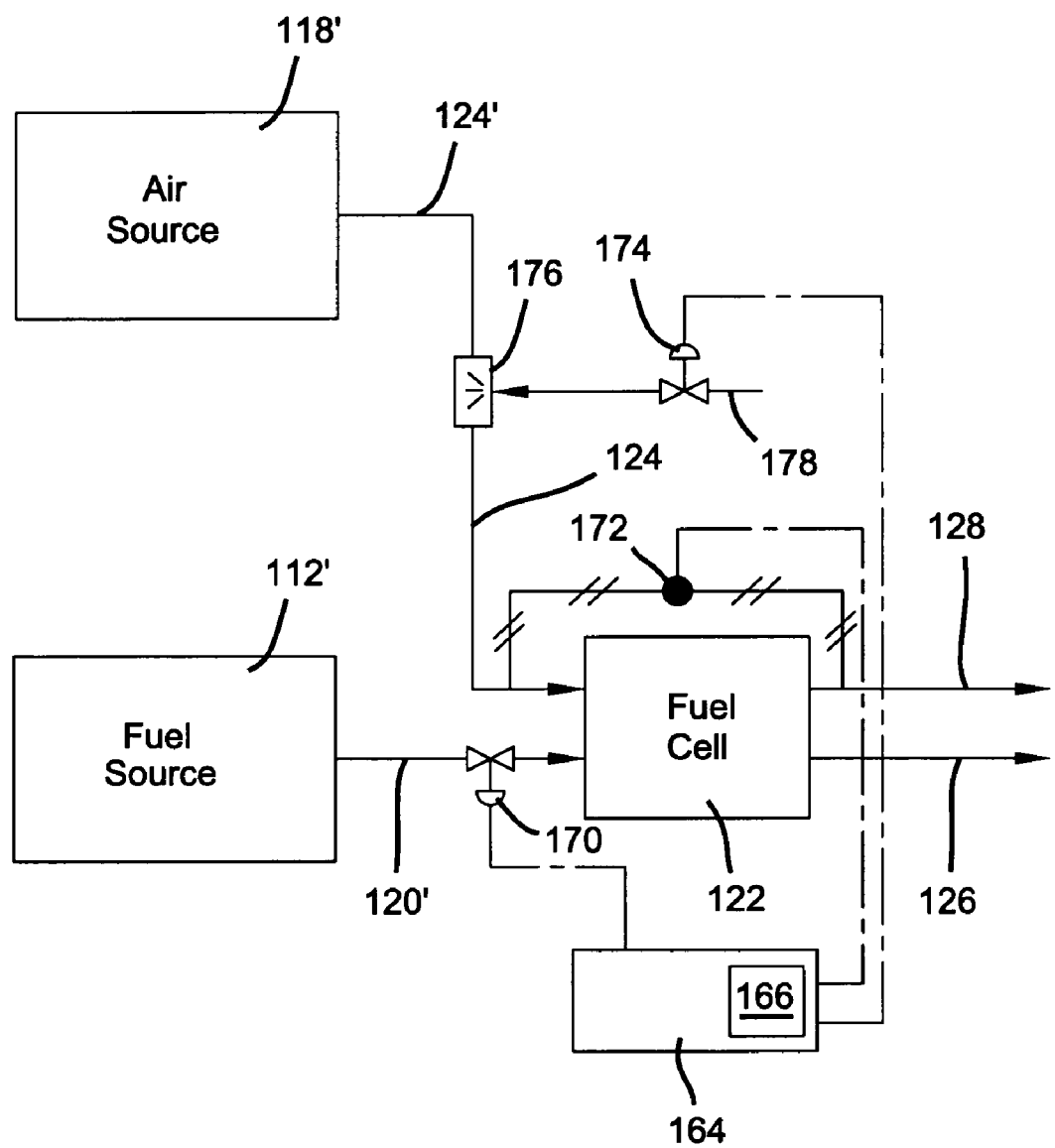
FIG. 1B shows a hydrogen storage system in combination with a fuel cell power system with water addition via a humidifier.

As shown in FIG. 1B, a hydrogen feed stream 120' is provided from a suitable storage system 112' to the fuel cell 122. Likewise an oxygen feed stream 124' is provided from an air source 118'. The fuel cell stack 122, controller 164, control valves 170, 172, 174 and humidifier 176 are arranged in the manner described with reference to the fuel reforming system shown in FIG. 1A.

As used herein, "water" means water that, in compositional nature, is useful for operation of a fuel cell power system. While certain particulates are acceptable in generally available water, they might cause plugging in addition to plugging caused by particulates in the oxidant gas; therefore, as should be apparent, the water used must be appropriately filtered before being introduced into the fuel cell.

As should also be apparent, oxygen gas oxidant having greater than about 25 weight percent oxygen is, in some embodiments, fed or provided in stream 124 in the place of air.

The hydrogen from reformate stream 120 and the oxygen from oxidant stream 124 react in fuel cell stack system 122 to produce electricity.

Anode exhaust (or effluent) 126 from the anode side of fuel cell stack system 122 may contain some unreacted hydrogen. Cathode exhaust (or effluent) 128 from the cathode side of fuel cell stack system 122 may contain some unreacted oxygen. These unreacted gases represent additional energy which may be recovered in combustor 130, in the form of thermal energy, for various heat requirements within power system 100.

Specifically, as shown in FIG. 1A, a hydrocarbon fuel 132 and/or anode effluent 126 are combusted, catalytically or thermally, in combustor 130 with oxygen provided to combustor 130 either from air in stream 134 or from cathode effluent stream 128, depending on power system 100 operating conditions. Combustor 130 discharges exhaust stream 154 to the environment, and the heat generated thereby is directed to fuel processor 112 as needed.

With references again to FIGS. 1A and 1B, real-time computer 164 effects control of control valves 170 and 172 in response to a signal from differential pressure transducer 172. That is, the hydrogen feed to fuel cell stack system 122 is controlled in part through manipulation of valve 170 and water fed to humidifier 176 is controlled in part through manipulation of valve 174 by real-time computer 164 with respect to measurements from differential pressure transducer 172 in operation of fuel cell stack system 122.

Controller logic 166 is provided in real-time computer 164 for execution in real-time by computer 164. In this regard, controller logic 166 is also denoted as "software" and/or a "program" and/or an "executable program" within real-time computer 164 as a data schema holding data and/or formulae information and/or program execution instructions. Controller logic 166 is, in a preferred embodiment, machine code resident in the physical memory storage of computer 164. Controller logic 166 is preferably derived from a source language program compiled to generate the machine code. The physical memory storage is in electronic data communication with a central processing unit (CPU) of computer 164 which reads data from the physical memory, computationally modifies read data into resultant data, and writes the resultant data to the physical memory. Computer 164 also reads signals from transducer 172 and effects signals to valves 170 and 174 according to the provisions of controller logic 166. In one embodiment, computer 164 and executable code for controller logic 166 are provided as an ASIC (application-specific integrated circuit).

Figure 2:
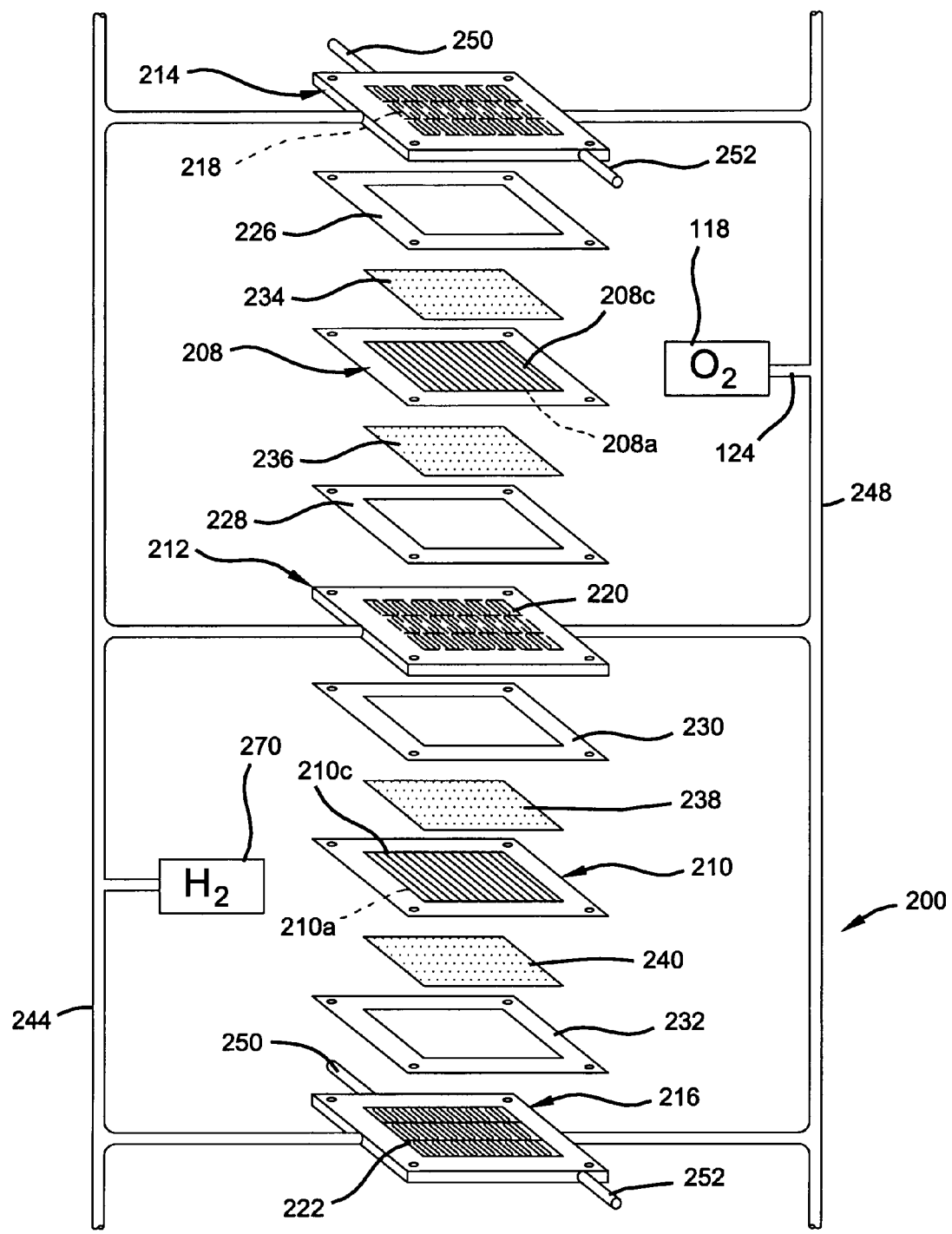
FIG. 2 shows detail in a portion of a PEM fuel cell stack within the fuel cell stack assembly of the fuel cell power system of FIG. 1.

Turning now to FIG. 2, a partial PEM fuel cell stack 200 of fuel cell stack system 122 is schematically depicted as having a pair of membrane electrode assemblies (MEAs) 208, 210 separated from each other by a non-porous, electrically-conductive bipolar plate 212. Each of MEAs 208, 210 have a cathode face 208c, 210c and an anode face 208a, 210a. MEAs 208, 210 and bipolar plate 212 are stacked together between non-porous, electrically-conductive, liquid-cooled end plates 214 and 216. Plates 212, 214, 216 each include respective flow fields 218, 220, 222 typically defined by a plurality of flow channels formed in the faces of the plates for distributing fuel and oxidant gases (i.e., $H_2$ & $O_2$) to the reactive faces of MEAs 208, 210. Nonconductive gaskets or seals 226, 228, 230, 232 provide sealing and electrical insulation between the several plates of fuel cell stack 200. Porous, gas-permeable, electrically-conductive sheets or diffusion media 234, 236, 238, 240 press up against the electrode faces of MEAs 208, 210 and serve as primary current collectors for the respective electrodes and also provide mechanical supports for MEAs 208, 210, especially at locations where the MEAs are otherwise unsupported in the flow field.

Bipolar plate 214 presses up against primary current collector 234 on cathode face 208c of MEA 208, bipolar plate 216 presses up against primary current collector 240 on anode face 210a of MEA 210, and bipolar plate 212 presses up against primary current collector 236 on anode face 208a of MEA 208 and against primary current collector 238 on cathode face 210c of MEA 210.

An oxidant gas such as air/oxygen is supplied to the cathode side of fuel cell stack 200 from an air source such as an air compressor or a storage tank 118 and line 124 via appropriate supply plumbing 248. A fuel such as hydrogen is supplied to the anode side of fuel cell 200 from a hydrogen source such as fuel reformer or a storage tank 270 via appropriate supply plumbing 244.

Exhaust plumbing (not shown) for both the $H_2$ and $O_2$/air sides of MEAs 208, 210 is also provided for removing anode effluent from the anode flow field and the cathode effluent from the cathode flow field. Coolant plumbing 250, 252 is provided for supplying and exhausting liquid coolant to bipolar plates 214, 216, as needed.

It is to be noted that fuel cell stack 200 shows two fuel cells with plate 212 being shared between the two fuel cells and plates 214, 216 being shared between one of the shown fuel cells and, in each case, another fuel cell not depicted in FIG. 2. In this regard, a "fuel cell" within a fuel cell stack is not physically fully separable insofar as any particular fuel cell in the stack will share at least one side of a bipolar plate with another cell. It should be appreciated that a fuel cell stack includes multiple fuel cells as dictated by the application for this system.

Turning now to further detail in controller logic 166 of computer 16, controller logic 166 captures a set of differential pressure measurement signals from differential pressure transducer 172 over a period of time. In this regard, a set of signals is, in one exemplary embodiment and without limitation, a set of 10,000 signal measurements where 1000 signal measurements are taken per second (i.e., Hz 1000) for 10 seconds. Inherently, the differential pressure signal from transducer 172 will fluctuate; accordingly, fluctuation parameters describing the nature of these fluctuations are defined and derived by controller logic 166 from this set of 10,000 differential pressure measurement signals. In preferred embodiments, at least 100 samples of differential pressure are acquired each second.

The nature of the fluctuation parameters are that they are statistical parameters representative of the set of differential pressure measurement signals and, in some embodiments, the statistical parameters defined by logic 166 include a single statistical indicator representative of the fluctuations of the set. In this regard, for example and without limitation, a root-mean-square (rms) of the set is defined in one embodiment, the variance in another embodiment, and the standard deviation of the set in yet another embodiment.

Another embodiment executes a process of determining fluctuation instances in the set of said differential pressure measurement signals, with a fluctuation instance being a movement from the mean (or the running mean as computed from, in one embodiment, a subset series of the set or, in another embodiment, as computed from an existing mean with a subtraction of senescent data values and addition of an essentially equivalent number of recently acquired data values) of the set beyond a triggering threshold defined to indicate a fluctuation instance. From the set of fluctuation instances, a maximum value for each fluctuation instance and a minimum value for each fluctuation instance is derived. A single representative statistical indicator from all the maximum and minimum values of the fluctuation instances of the set is then calculated. In this regard, for example and without limitation, a root-mean-square of the set is defined in one embodiment, the variance of the set in another embodiment, and the standard deviation of the set in yet another embodiment. Other embodiments execute a Fast-Fourier-Transform (FFT) on the signal data to define frequency response function values as the fluctuation parameters from the set.

The statistical indicator is compared in logic 166 to a threshold variable, and a determination for further action is based upon the comparison. In this regard, an indicator may be activated in one embodiment to alert the human operator of the fuel cell to potential flooding if the comparison indicates that the statistical indicator is larger than the threshold. In another embodiment, the flow of vaporized water 178 is adjusted downward by logic 166 and computer 164 via control valve 174 in response to a comparison indicating that the statistical indicator is larger than the threshold; alternatively, the flow of vaporized water 178 is adjusted upward by logic 166 and computer 164 via control valve 174 in response to a comparison indicating that the statistical indicator is lower than the threshold. In yet other respective embodiments, logic 166 and computer 164 modify cell load, modify cell backpressure, modify reactant gas flow, and/or otherwise modify reactant gas humidity in response to comparisons indicating that the statistical indicator differs from the threshold.

Figure 3:
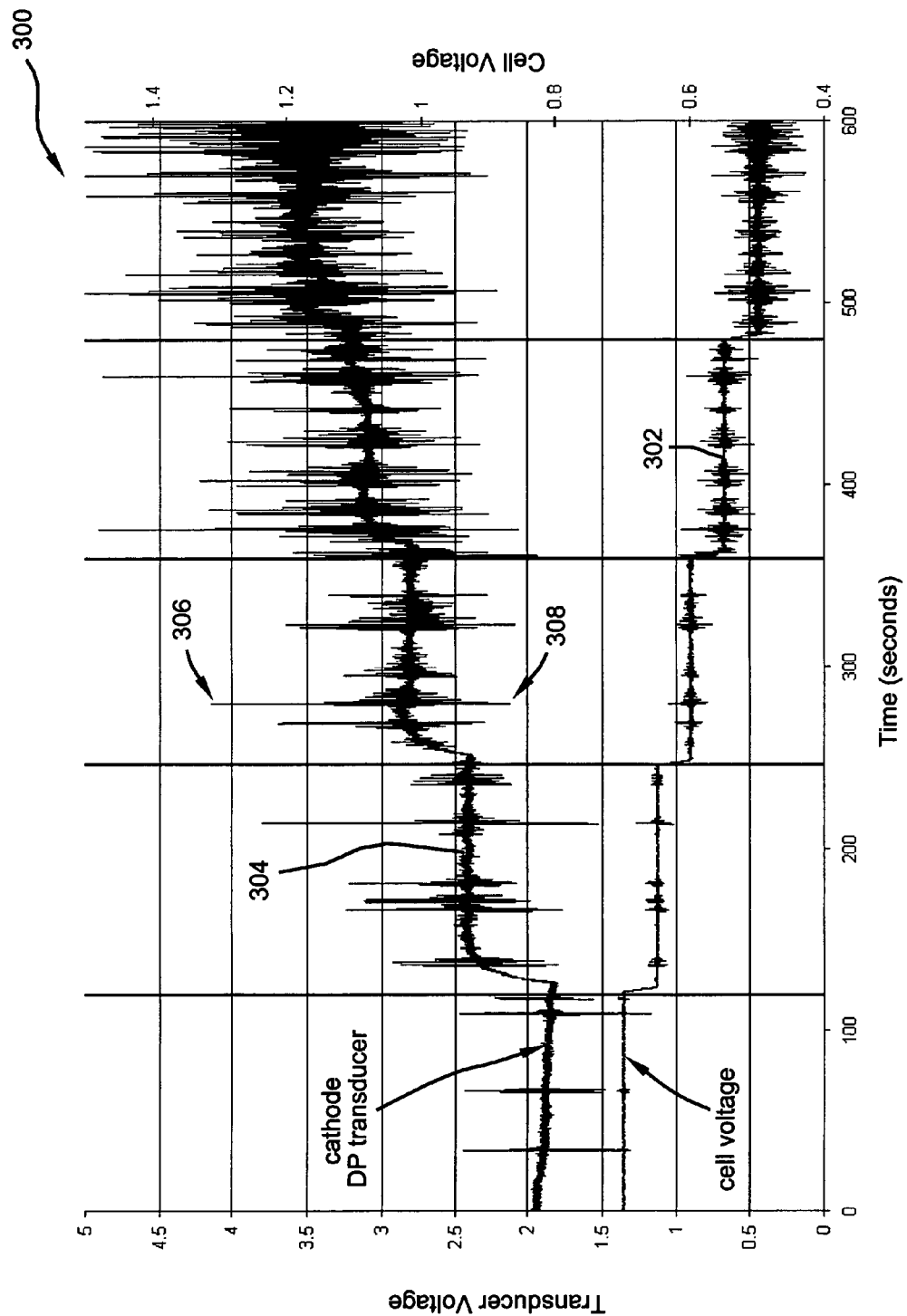
FIG. 3 shows detail in a set of values from a differential pressure signal and a cell voltage signal from a fuel cell stack during a period of time when water is progressively increased in reactant flow channels of the cell until a flooding condition occurs.

Turning now to FIG. 3 and a trace plot 300 shows a set of differential pressure signals 304 and trace plot 302 shows a set of cell voltage signals from a fuel cell stack during a period of time when water is progressively increased in the cell until a flooding condition occurs. A cathode manifold differential pressure (DP) transducer signal 304 taken across the inlet and outlet of the cathode flow channel and manifold is plotted (in units identified on the leftmost vertical axis) with respect to a 10 minute operation time.

A 3 channel serpentine cathode flow field plate with 15 passes and a 2 channel serpentine anode flow field plate with 22 passes was used in a 50 cm$^2$ fuel cell; a co-flow orientation was used for the run. The data acquisition system was modified to enable acquisition of cell voltage 302 and the raw voltage signals from the anode and cathode (DP data 304) differential pressure, transducers at data rates up to 1000 Hz. Other test conditions were: anode and cathode pressure of essentially 170 kPa$_g$; fuel cell temperature of 80° C.; anode and cathode stoichiometry of 2.0; anode relative humidity of 100%; and cathode-inlet relative humidity of 50%. Over a period of 10 minutes, cell voltage was decreased from 0.7 V to 0.5 V in 0.05 V increments (see FIG. 3). The differential pressure signal 304 from the cathode is clearly much larger than the cell voltage 302, thereby providing a significantly more sensitive indication of liquid water accumulation on the cathode side. Indeed, in some cases, the fluctuations of the cathode differential pressure transducer signal are as much as 10 times the magnitude of the comparable fluctuations in the cell voltage signal. In this regard, while the maximum cell voltage fluctuations are on the order of 50 mV, the maximum fluctuations in the cathode differential pressure transducer signal are on the order of 0.5-1.0 V.

Signal 304 fluctuates (with a local fluctuation maximum 306 and a local fluctuation minimum 308 identified in plot 300). Cell output voltage 302 is plotted (in units identified on the rightmost vertical axis) for reference. Note the higher sensitivity of the differential pressure across the cathode flow than is obtainable from the cell output voltage. The increased flooding is apparent as the time of the run increases and the cell voltage is diminished, with essentially ongoing substantial differential pressure fluctuation being apparent after 500 seconds.

Figure 4:
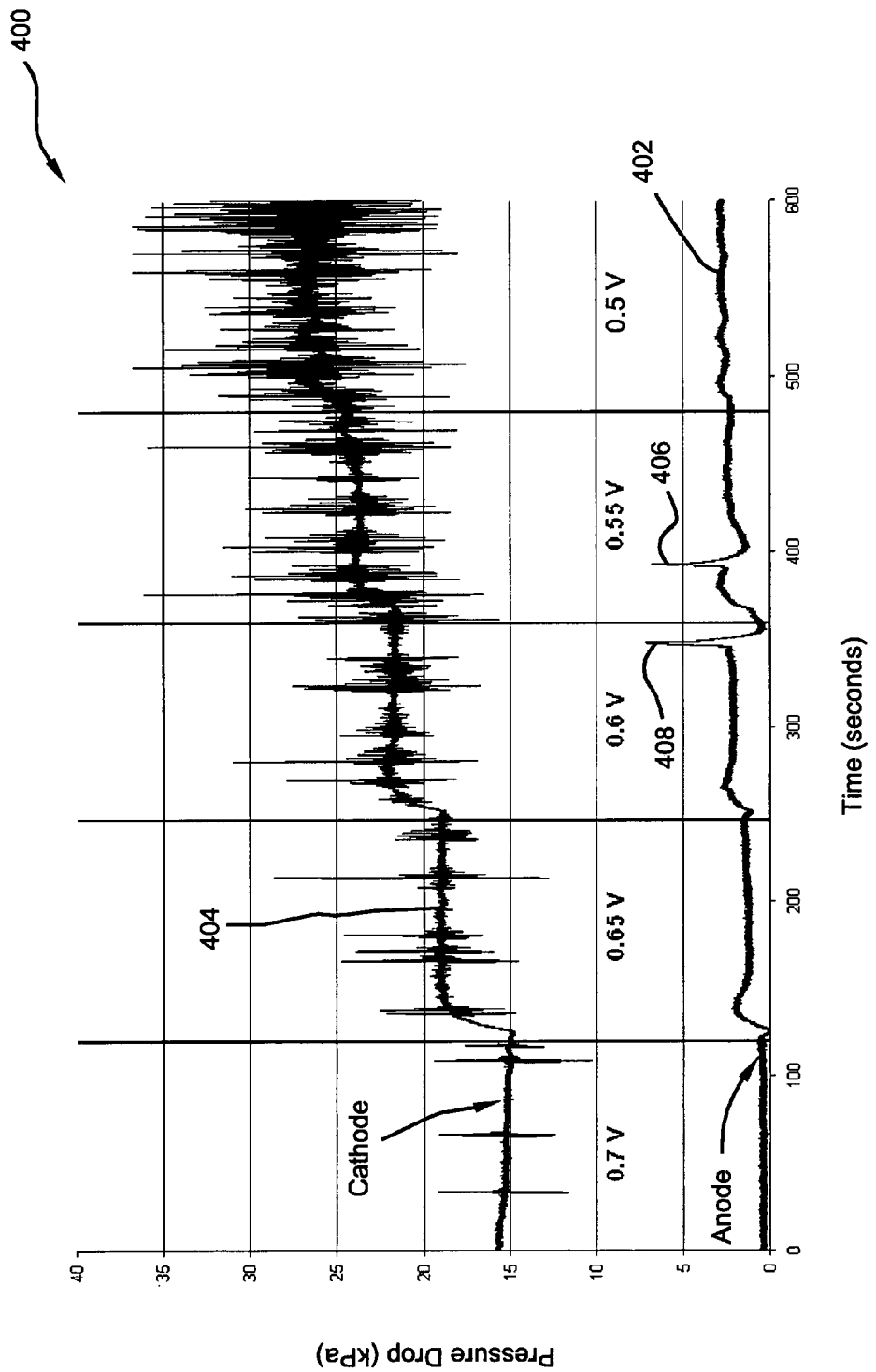
FIG. 4 shows pressure drop detail in both the cathode reactant flow channels and the anode reactant flow channels for the sets of values presented in FIG. 3.

FIG. 4 shows trace 400 indicating pressure drop detail in both the cathode reactant flow channels (differential pressure signal 404 conveniently reprising differential pressure signal 304 in a patterned sense but on a pressure scale as opposed to a voltage) and the anode reactant flow channels for the progressive addition whose cathode differential pressure signal values and cell voltage signal values are plotted in FIG. 3. With reference to FIG. 4, the mean cathode differential pressure (signal 404) increased as the cell voltage (402) decreased (as expected, because the cell load and, hence, anode and cathode gas flows increased), but there was a significant variation in the differential pressure 404 fluctuations as more water accumulated in the cell flow channels at low voltage. On the anode side, no such fluctuations were measured, except for two large spikes 406, 408 between 300 and 400 seconds when water slugs were noted to be discharged through the outlets of the anode flow channels.

Figure 5:
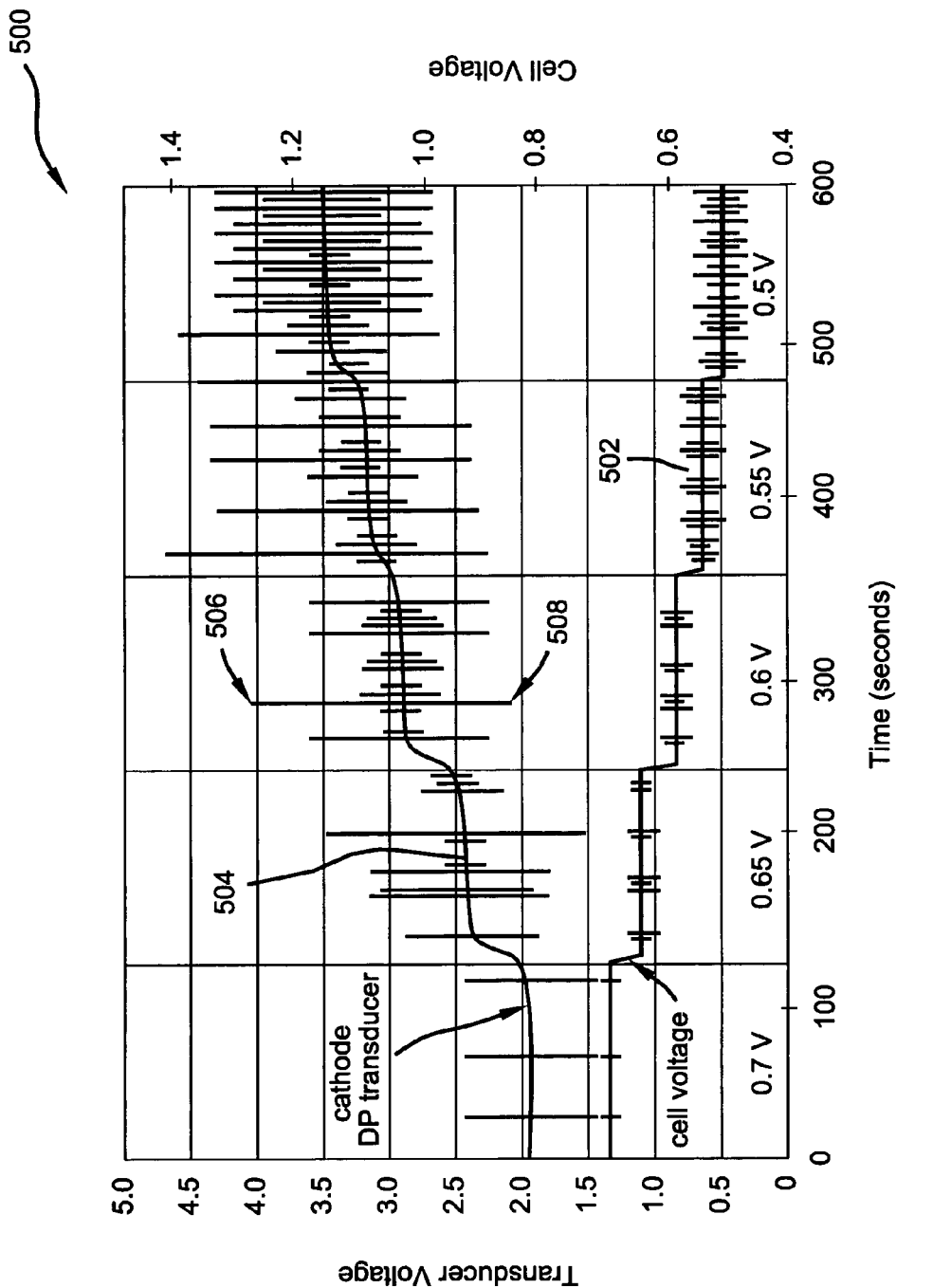
FIG. 5 shows fluctuation instance detail in the differential pressure signal and cell voltage signal value sets of FIG. 3.

FIG. 5 shows trace 500 indicating fluctuation instance detail in the differential pressure signal and cell voltage signal set of the data plotted in FIG. 3. Fluctuation instances (e.g. the instance between 506 and 508) in the set of the differential pressure measurement signals are determined from comparable points in signal history 300 where the value of signal 504 deviates from the running average value by a trigger threshold, a maximum value for the 506/508 fluctuation instance is the value at 506, a minimum value for the fluctuation instance is the value at 508 in establishing a single representative statistical indicator value for the data of FIG. 5, the value is calculated from all maximum and minimum values of all 68 fluctuation instances of the set taken over the 10 minute periods. Alternatively, the value could be specific to other time slices in the 600 second set in one embodiment or to every n identified fluctuations in an alternative embodiment.

Figure 6:
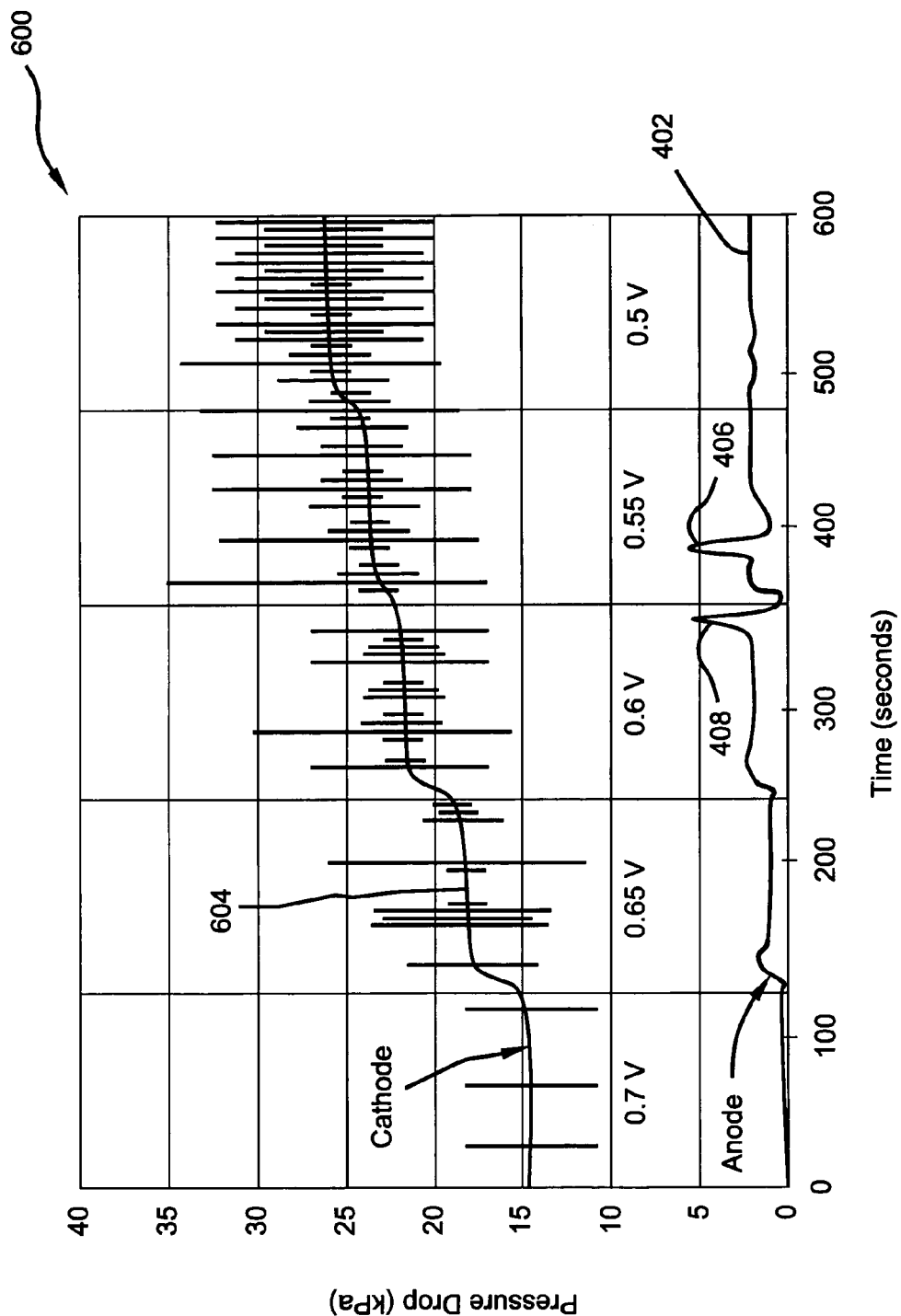
FIG. 6 shows fluctuation instance detail in the differential pressure signal value sets of FIG. 4.

FIG. 6 shows trace 600 indicating fluctuation instance detail in the differential pressure signal 604 and cell voltage signal 402 set of the data plotted in FIG. 4 for the cathode signal. The anode signal is not converted to fluctuation instance detail in trace 600. As should be apparent, considerations in comparison of FIGS. 3 and 5 apply to comparison of FIGS. 4 and 6. Note that flooding spikes 408 and 406 in the anode are not necessarily strongly correlated to a comparable fluctuation instance in the cathode differential pressure; in this regard, the use of two differential pressure transducers in a fuel cell, on each of the cathode and the anode, is of value in comprehensive monitoring of the fuel cell stack for flooding onset.

As described herein, the derivation and use of fluctuation parameters from a set of differential pressure measurements across the inlet and outlet of the reactive flow channels provides a fuel cell power system benefiting from full humidification of the feed gases (especially the oxidant). Such operation is enabled because the described embodiments provide an accurate determination of the onset of flooding status and control action responsive to the determination of flooding onset sufficient to preclude flooding from actually occurring within the fuel cell. Other benefits include optimization of stoichiometry with a comparable optimization of air compressor capacity, effective management of rapid power transients, and data for effective management of stack purge. All of these benefits derive from use of low cost and conveniently implemented instrumentation which is located in conveniently-accessible header and manifold regions of the fuel cell stack. In this regard, fiber optic dynamic pressure sensors are contemplated for providing space effective robust measurements free from electromotive interference; such sensors also are contemplated for providing regionally accurate representative interim differential pressure measurements from points between the inlet and outlets of the reactant flow channels.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack comprising: a fuel cell having an inlet, a flow field in fluid communication with said inlet and an outlet in fluid communication with said flow field; a vaporized water source in fluid communication with said inlet; a differential pressure transducer repeatedly measuring a differential pressure across said flow field and generating a set of differential pressure signals; a computer comprising a collection of the set of differential pressure signals measured during operation of the fuel cell; and the computer further comprising a controller in communication with said differential pressure transducer, said controller is configured to execute logic for determining a root-mean-square value from only said collection of the set of differential pressure signals and control circuitry for controlling said vaporized water source in response to the root-mean-square value, wherein the fuel cell stack attains a steady state in less than about 100 seconds at a sampling of about 10 Hz or greater.

2. The fuel cell of claim 1 wherein said controller further comprises executable logic for comparing said root-mean-square value to a threshold value.

* * * * *